Figure 1:
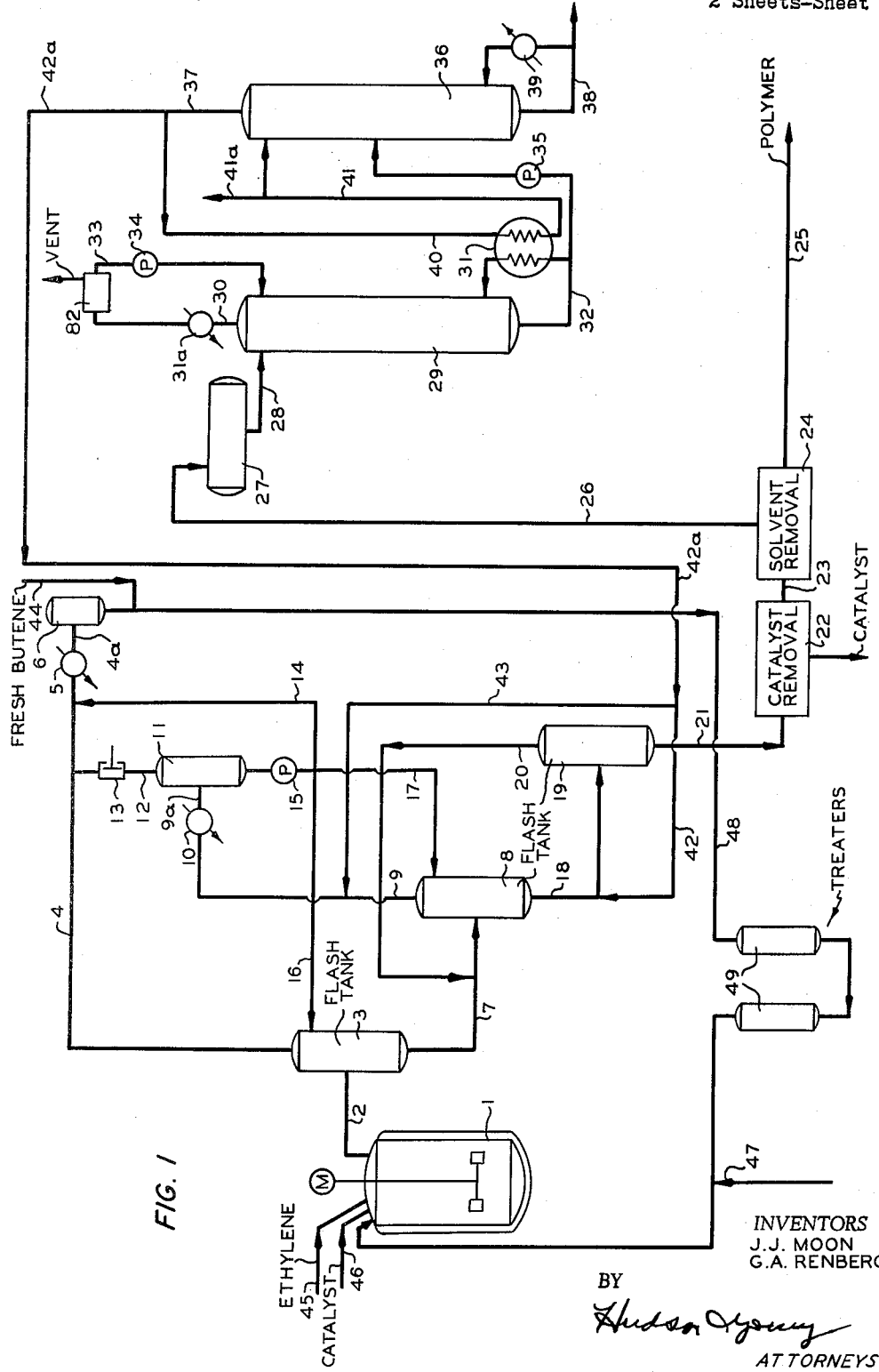

April 12, 1966

J. J. MOON ETAL 3,245,967

SOLVENT AND MONOMER RECOVERY

Filed Nov. 6, 1961

2 Sheets-Sheet 2

INVENTORS
J.J. MOON
G.A. RENBERG

BY

ATTORNEYS

United States Patent Office 3,245,967
Patented Apr. 12, 1966

3,245,967
SOLVENT AND MONOMER RECOVERY
John J. Moon and Graham A. Renberg, both of Bartlesville, Okla., assignors to Phillips Petroleum Company, a corporation of Delaware
Filed Nov. 6, 1961, Ser. No. 150,459
9 Claims. (Cl. 260—88.2)

This invention relates to an improved recovery of solvent in the polymerization of a polymerizable monomer. In one of its aspects, the invention provides a combination of steps including the flashing of solvent, recovery of vapors, and utilization of heat in the vapors to aid in the drying and/or in the flashing of said solvent.

In the polymerization of olefins, as in the polymerization of ethylene alone, or in conjunction with butene, as when preparing a solid polyolefin or plastic material, the reaction or polymerization is conducted in one type of operation exemplified by U.S. Patent 2,825,721, Hogan and Banks, issued March 4, 1958, in the presence of a solvent. Thus, there can be subjected to the action of a catalyst such as described in said patent, ethylene and butene-1, in a solvent, say, a mixture of hexane and cyclohexane. Upon termination of the polymerization reaction step, the polymer-containing solvent is flashed to recover unreacted monomer, catalyst, polymer and soluble polymer dissolved in some solvent. The solvent must be treated prior to reuse. In the treatment of the solvent, usually by fractionation, impurities such as water, inert light hydrocarbons and small quantities of solvent-soluble polymers must be removed.

In prior art processes for carrying out the solvent purification step, it has been conventional to revaporize the bulk of the solvent to effect the purification. The vaporized solvent is then condensed and cycled to the reactor. In prior art processes, the heat of condensation has been rejected to the atmosphere.

It has now been conceived by us that considerable heat of condensation can be saved and compression requirements substantially reduced by using vaporized solvent as heat exchange medium in a solvent-drying step and as a stripping medium in the flshing of the reactor effluent. Unreacted monomer or monomers are thus recovered in a manner such that upon condensation of the vapors resulting from the flashing of the reactor effluent, the monomers can be recycled to the reactor as a solution of monomer or monomers in the solvent which is recycled as a liquid.

In a prior process, the solvent purification system comprises a polymer removal column and a drying column operated in series in the here stated order. The polymer removal column removes soluble polymer as a bottoms stream and solvent, water, and light materials as an overhead stream. In the drying column, pure solvent is removed as a bottoms product. Overhead from the drying column consists essentially of water, small amounts of solvent and inert light hydrocarbons. The light inerts are vented, water is separated out and solvent passed to a solvent recovery accumulator.

We have now found that considerable improvement in the solvent purification process is obtained if the order of these two columns is reversed, that is, the degassing column is first in the series. By operating in this manner, a portion of the overhead vapors from the polymer removal column may be used to reboil the drying column. The resulting condensate is then used as reflux in the polymer removal column. The remaining portion of polymer removal column overhead vapors is passed to the monomer flash step where they aid in flashing unreacted monomer from the polymer solution. Specifically, in one embodiment, overhead vapors are passed to the feed to a third flash vessel of a series of three flash vessels and used therein as an aid to flashing. Overhead vapors from the third flash vessel are passed to the feed to the second flash vessel operated at 60 p.s.i.g. The overhead vapors from the second flash vessel are partially condensed and the remaining vapors compressed to 300 p.s.i.a. The overhead condensate containing a substantial portion of unreacted monomers is combined with the compressor effluent and with the vapors from the first stage flash which is operated at 300 p.s.i.a. The total mixture is then condensed. At this point, make-up butene-1 is added and the total liquid stream is then pumped to reactor pressure and passed over alumina beds to remove poisons and the liquid mixture passed to the reactors for polymerizations in the presence of catalyst.

In another embodiment of the invention, non-vaporized liquid from a single flash step is passed to a stripper to which the overhead vapors from a polymer removal column are passed. Certain advantages accrue in this embodiment which basically is otherwise like the first embodiment herein mentioned.

The above-described process is particularly applicable to the production of ethylene-butene-1 copolymers. The process is, in general, applicable to any solution polymerization process in which it is desirable to recover unreacted monomers and to purify solvent.

By virtue of our process, which combines the monomer recovery and solvent purification steps in a solution polymerization process, considerable economy is effected as a result of lower compression costs, lower energy requirements and improved processing sequences.

An object of the present invention is to provide an improved solvent and monomer recovery. Another object of the invention is to provide an improved process for the polymerization of at least one 1-olefin in the production of so-called low pressure polyolefin. Another of its objects is to provide a novel combination of steps in the solvent and polymer recovery in a polyolefin-producing process permitting the recovery of unreacted monomer as a solution in solvent, heat savings, and reduced compression costs.

Other aspects, objects and the several advantages of this invention are apparent from a study of this disclosure, the drawing and the appended claims.

According to the present invention, broadly, the effluent from a polyolefin reactor is flashed in at least one flashing step, polymer-containing solvent is separated from catalyst, solid polymer is separated from the solvent and dissolved soluble polymer, as well as impurities, etc. and the solvent containing the dissolved polymer, etc. is relieved of gases such as light hydrocarbons, e.g., methane, ethane, etc. and water vapor, following which the solvent is passed to a solvent-recovery or polymer removal in which the solvent is recovered as a vapor and thus separated from the soluble polymer; then at least a portion of the solvent vapors is used to provide heat required in relieving the solvent of said gases and water vapor and another portion of said vapors is used in this flashing step.

Figure 2:
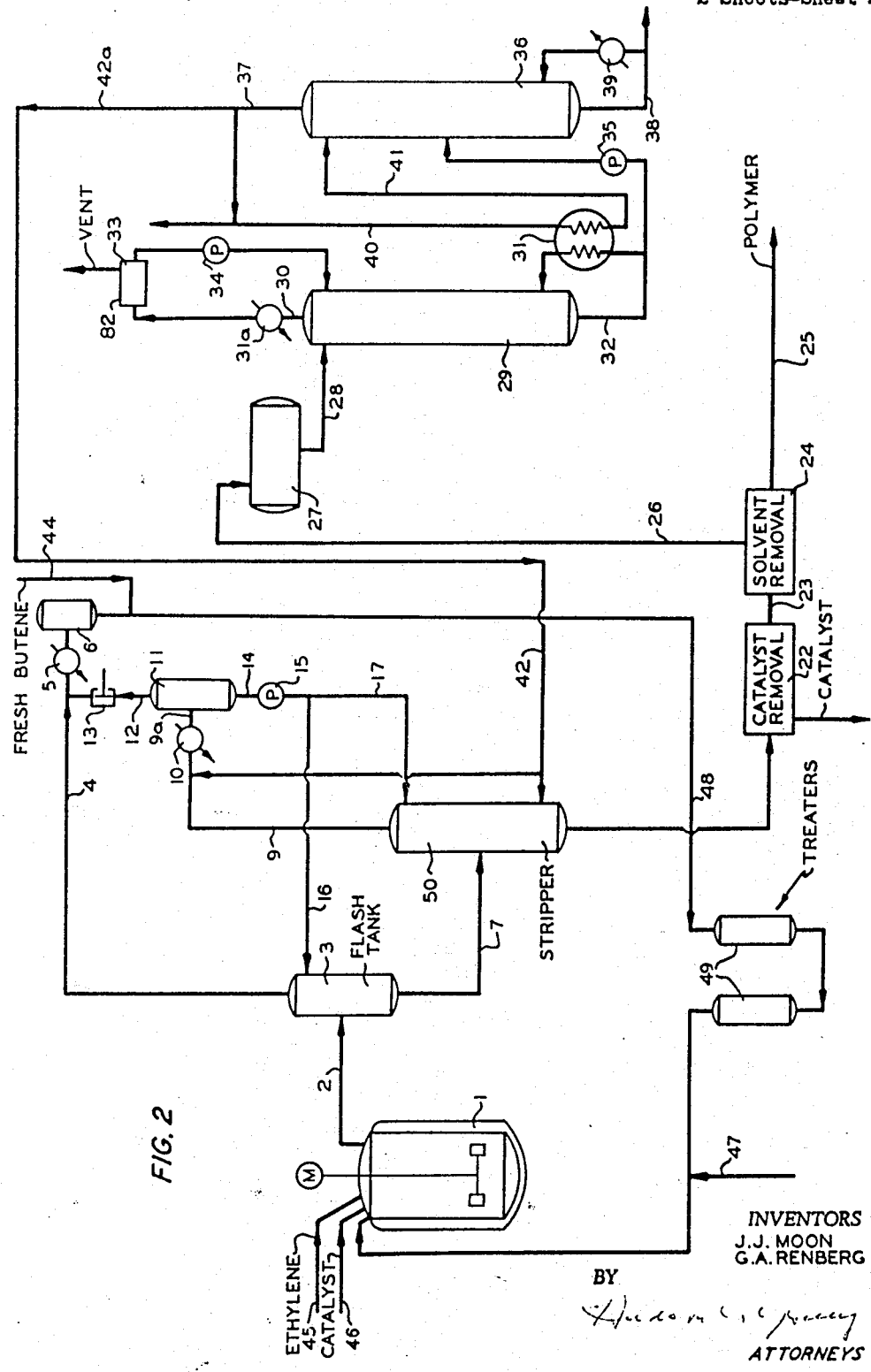

FIGURE 1 of the drawing shows the overall embodiment of the invention in which three flash vessels are used. FIGURE 2 is a modification of the operation of FIGURE 1 in which only a single flash vessel and a stripper are used in lieu of the three flash vessels, earlier mentioned.

Referring now to FIGURE 1 of the drawing, 1 is a polyolefin reactor in which, in the example now given, ethylene and butene-1 are subjected to the polymerizing action of a catalyst containing chromium oxide, at least part of which is in the hexavalent state, which is known as a catalyst for polymerizing 1-olefins and is more fully described in said Patent 2,825,721. The olefins are polymerized in reactor 1 in the presence of solvent, in this case, a mixture of hexane and cyclohexane. After the reaction, the reaction mass passes by 2 to flash vessel 3 wherein vapors formed are separated from the liquid solvent-containing catalyst, polymer, etc. and passed by 4 through cooler 5 into receiver 6. From receiver 6, the condensed solvent, vapors and monomers in them are recycled by 48 and treaters 49 to the reactor. Non-vaporized liquid passes from 3 by 7 into a second flash vessel 8, overhead from which passes by 9 and cooler 10 into liquid separator 11. Vapors from 11 are passed by 12 and compressed by 13 into 4 and treated further together with the vapors in 4. At least a portion of liquid from 11 is passed by pump 15, and line 16 to vessel 3 as reflux, the remaining liquid not used as reflux being passed by 14 to 4. A portion of the reflux is also passed by 17 to vessel 8. Liquid from vessel 8 is passed by 18 to a third flash vessel 19, overhead from which is returned to vessel 8 for retreatment therein, the return being by way of 20, while liquid bottoms, which are considerably depleted of hydrocarbon such as ethylene, ethane, butene-1 and other $C_4$'s, but which contain solvent, polymer and catalyst, are passed by 21 to catalyst removal 22 and by 23 to solvent removal 24, at which place the desired polymer is separated at 25. Solvent still containing hydrocarbons and soluble polymer passes by 26 to feed tank 27 and by 28 to tower 29, overhead from which contains water vapor and light hydrocarbons. The tower is heated with hot vapors obtained, as later described by means of indirect heat exchanger 31, here shown as the reboiler heating the bottoms 32 of the tower. This tower is refluxed with condensate from vapors 30 which pass through cooler 31a into vented accumulator 82. The reflux is passed from 82 by 33 and pump 34. The solvent now containing essentially only soluble polymers passes by pump 35 into tower 36 wherein solvent vapors taken off overhead by 37 and bottoms 38, which are reboiled at 39, are removed as a concentrated soluble polymer in solvent. Overhead solvent vapors 37 in this embodiment are sent, in part by 40 to boiler 31 and returned by 41 as reflux for tower 36, thus providing reflux from the heating agent delivered to 31, and, in part, by 42a to aid in flashing vapors in flash vessel 19. Any excess vapor passes by 43 into 9. Some liquid purified solvent is taken off at 41a and is returned by pipes, not shown, to the solvent storage in the system, also not shown. Fresh butene-1 is fed to the system at 44. Ethylene is fed at 45 and catalyst at 46. Make-up solvent is fed to the system at 47.

It will be noticed by one skilled in the art having studied this embodiment of the invention that the heat input of the two towers is by way of the soluble polymers-removal tower and that the reversal of the functions of the two described towers permits, in one operation, the savings of heat and vapors in 37, the provision of heat to 31 to degas the solvent, and the cooling in 31 to provide a reflex for tower 36.

The following tables give the conditions and analyses of the principal locations and streams, respectively, in the embodiment just described.

*Conditions*

|  | Temperature, °F. | Pressure p.s.i.a. |
|---|---|---|
| Reactor 1 | 290 | 435 |
| Flash vessel 3 | 275 | 300 |
| Flash vessel 8 | 242 | 60 |
| Flash vessel 19 | 272 | 70 |
| Tower 29: | | |
| Top | 210 | } 45 |
| Bottom | 245 | |
| Tower 36: | | |
| Top | 290 | } 80 |
| Bottom | 300 | |

*Stream compositions*

| Material Balance LB/SD 0.9 Stream Factor | Fresh ethylene | Fresh butene | Recycle liquid to reactors | Reactor effluent | Primary flash vapor | Primary flash liquid | Tertiary flash vapor | Secondary flash vapor | Secondary flash liquid |
|---|---|---|---|---|---|---|---|---|---|
| Stream No | 45 | 44 | 48 | 2 | 4 | 7 | 20 | 9 | 18 |
| Methane | 17 |  | 928 | 945 | 425 | 541 | 14 | 560 | 15 |
| Ethylene | 116,634 |  | 62,546 | 63,700 | 25,950 | 39,150 | 1,764 | 40,336 | 1,932 |
| Ethane | 151 |  | 8,309 | 8,460 | 3,450 | 5,202 | 220 | 5,367 | 241 |
| Butene-1 |  | 2,672 | 14,456 | 12,936 | 1,596 | 12,250 | 3,276 | 12,038 | 4,368 |
| Other $C_4$'s |  | 100 | 3,150 | 3,150 | 336 | 3,053 | 347 | 3,197 | 435 |
| Hexane |  |  | 522,070 | 544,430 | 21,758 | 570,670 | 319,490 | 364,702 | 571,900 |
| Cyclohexane |  |  | 518,810 | 544,430 | 17,724 | 574,796 | 268,800 | 329,005 | 561,120 |
| Polymer |  |  |  | 117,000 |  | 117,000 |  |  | 117,000 |
| Catalyst |  |  |  | 234 |  | 234 |  |  | 234 |
| Total | 116,802 | 2,772 | 1,130,269 | 1,295,285 | 71,239 | 1,322,896 | 593,911 | 755,205 | 1,257,245 |
| G.p.m. (60° F.) |  |  | 131 | 137 |  | 152 |  |  | 145 |

| Material Balance LB/SD 0.9 Stream Factor | Tertiary flash stripping solvent | Tertiary flash liquid | Solvent vapor by-pass | Purified solvent vapor | Secondary flash separator feed | Separator flash liquid | Combined flash OHD vapor | Total flas OVHD |
|---|---|---|---|---|---|---|---|---|
| Stream No | 42 | 21 | 43 | 37 | 9a | 14 | 4a | 6 |
| Methane |  | 1 |  |  | 560 | 255 | 714 | 928 |
| Ethylene |  | 168 |  |  | 40,336 | 17,222 | 48,078 | 62,546 |
| Ethane |  | 21 |  |  | 5,367 | 2,367 | 6,320 | 8,309 |
| Butene-1 |  | 1,092 |  |  | 12,038 | 11,198 | 2,376 | 11,784 |
| Other $C_4$'s |  | 88 |  |  | 3,197 | 2,946 | 575 | 3,050 |
| Hexane | 370,230 | 622,640 | 152,112 | 523,314 | 595,562 | 590,562 | 25,948 | 522,070 |
| Cyclohexane | 429,660 | 721,980 | 176,132 | 606,920 | 596,323 | 591,673 | 21,756 | 518,810 |
| Polymer |  | 117,000 |  |  |  |  |  |  |
| Catalyst |  | 234 |  |  |  |  |  |  |
| Total | 799,890 | 1,463,224 | 328,244 | 1,130,234 | 1,253,383 | 1,216,223 | 105,767 | 1,127,497 |
| G.p.m. (60° F.) | 92 | 169 |  |  |  | 141 |  |  |

Stream compositions—Continued

| Material Balance LB/SD 0.9 Stream Factor | Drying column feed | Reflux to drying column | Drying column overhead | Drying column bottoms | Polymer removal col. feed | Polymer column reflux | Drying column reboiling vapor | Polymer column bottoms | Purified solvent liquid from column | Wet polymer to dryer | Dry polymer |
|---|---|---|---|---|---|---|---|---|---|---|---|
| Stream No. | 28 | 33 | 30 | 32 | 35 | 41 | 40 | 38 | 41a | 109 | 110 |
| Methane | 1 | | 1 | | | | | | | | |
| Ethylene | 199 | 1,103 | 1,302 | | | | | | | | |
| Ethane | 24 | | 24 | | | | | | | | |
| Butene-1 | 1,400 | 101,136 | 102,536 | | | | | | | | |
| Other $C_4$'s | 119 | 10,301 | 10,420 | | | | | | | | |
| Hexane | 709,906 | 99,846 | 99,938 | 709,814 | 637,194 | 182,451 | 294,955 | 1,376 | 112,504 | 161 | |
| Cyclohexane | 823,586 | 108,444 | 108,530 | 823,500 | 738,550 | 210,690 | 340,724 | 1,596 | 130,034 | 187 | |
| Polymer | 109 | | | 109 | 98 | | | 98 | | 116,509 | 116,509 |
| Water | 1,116 | 162 | 1,278 | | | | | | | 48,500 | 1,000 |
| Total | 1,536,460 | 320,992 | 324,029 | 1,533,423 | 1,375,842 | 393,141 | 635,679 | 3,070 | 242,538 | 165,357 | 117,509 |
| G.p.m. (60° F.) | 178 | 37 | | 177 | 158 | 45 | | .3 | 28 | | |

Referring now to FIGURE 2, wherein identical numbering with that of FIGURE 1 has been employed as far as possible, a single stripping vessel is substituted for the second and third stage flash vessels of FIGURE 1.

In this embodiment non-vaporized liquid passes from 3 via line 7 to stripping vessel 50, overhead from which passes by 9 and cooler 10 into liquid separator 11. A portion of liquid from 11 is passed by 14, pump 15 and line 16 to flash vessel 3 as reflux. The remaining portion of liquid from vessel 11 passes pia line 17 to stripper 50 wherein it is used as reflux. Overhead vapors from column 36 pass via lines 42a and 42 into the bottom of stripper 50 wherein said vapors are utilized as a stripping medium.

This embodiment has the advantage of requiring less equipment thus reducing investment and operating costs.

The flows of the various streams in this embodiment are essentially the same as for the embodiment described in connection with FIGURE 1. For example, stripper 50 will receive the same amount of stripping vapors from column 36 as flash vessel 19 receives in FIGURE 1. Reflux to stripper 50 will be at the same rate as reflux to flash vessel 8 in FIGURE 1.

Stripper 50 is a 6 ft. diameter column operated at 70 p.s.i.a., a top temperature of 255° F. and a bottom temperature of 275° F. The stripper is a packed column containing 15 ft. of conventional packing materials.

It is also within the scope of this invention to pass the polymerization reactor effluent directly to a stripping vessel to which overhead vapors from a polymer removal column are passed, said overhead vapors acting as an aid in stripping unreacted monomers from the polymerization effluent.

Reasonable variation and modification are possible within the scope of the foregoing disclosure, the drawing, and the appended claims to the invention, the essence of which is that by reversing the functions of the drying and polymer-removing columns, vapors from the polymer-removal column can be used not only for heating the drying column and thus also providing reflux for the polymer removal column, but also for flashing the reacted stream from the polyolefin reactor, substantially as described.

We claim:

1. In the recovery of a monomer, polymer and solvent from a solution of the monomer and polymer in said solvent which comprises passing said solution into a flashing zone, therein subjecting said solution to flashing conditions and to the stripping action of hot solvent vapor obtained ash hereinafter described, recovering a vapor stream-containing solvent and any substantially unpolymerized monomer, removing and condensing said vapor stream, passing a first liquid stream, thus obtained, to a drying zone, in said drying zone, indirectly heating said first liquid stream using heat obtained as hereinafter described, obtaining in, and removing from, said drying zone, water and light hydrocarbon vapors not removed from said solution in said flashing zone, withdrawing from said drying zone a second liquid stream containing solvent and soluble polymer therein, passing said second liquid stream into a heated distillation zone, in said heated distillation zone, distilling, separating and recovering solvent vapor from said soluble polymer, passing a portion of said solvent vapor into indirect heat exchange with said first liquid stream in said drying zone, returning the thus-employed portion of solvent vapor, now cooled, to said distillation zone, and passing another portion of said solvent vapor into said flashing zone as said hot solvent vapor to provide therein said stripping action.

2. In the production of a polyolefin by a solution polymerization in which an olefin is polymerized in a solvent and in which there is practiced a recovery which comprises passing said solution of the olefin and polymer formed in said solvent into a flashing zone, therein, subjecting said solution to flashing conditions and to the stripping action of hot solvent vapor obtained as hereinafter described, recovering the vapor stream-containing solvent and substantially unpolymerized monomer, removing and condensing said vapor stream, passing a liquid stream, thus obtained, to a drying zone, in said drying zone, heating said liquid stream using heat obtained as hereinafter described, obtaining in, and removing from, said drying zone, water and light hydrocarbon vapors not removed from said solution in said flashing zone, removing from said drying zone liquid containing solvent and soluble polymer therein, passing said liquid into a heated distillation zone, in said heated distillation zone, distilling, separating and recovering solvent vapor from said soluble polymer, passing a portion of solvent vapor into heat exchange with said liquid in said drying zone, and passing another portion of said solvent vapor into said flashing zone as said hot solvent vapor to provide therein said stripping action.

3. In the production of a solid polyolefin from at least one 1-olefin having 1–8 carbon atoms, a recovery according to claim 2 hereof.

4. In the recovery of a monomer, polymer and solvent from a solution of the monomer and polymer in said solvent which comprises passing said solution into a flashing zone, recovering a vapor stream containing solvent and any substantially unpolymerized monomer, removing and condensing said vapor stream, passing a liquid stream obtained from the flashing zone into a stripping zone, passing liquid obtained from said stripping zone to a drying zone, in said drying zone indirectly heating said stream obtained from said stripping zone using heat obtained as hereinafter described, obtaining in, and removing from said drying zone, water and light hydrocarbon vapors not removed from said solution in said flashing and stripping zones, withdrawing from said drying zone a bottoms product containing solvent and soluble polymer therein, passing said bottoms product into a heated distillation zone, in said heated distillation zone, distilling, separating and recoverng solvent vapor from said soluble polymer, passing a portion of said solvent vapor into indirect heat exchange with said drying zone bottoms product and passing another portion of said solvent vapor into said stripping zone as a hot solvent vapor to provide stripping action in said stripping zone.

5. In the recovery of a monomer, polymer and solvent from a solution of the monomer and polymer in said solvent which comprises:
  (a) passing said solution to a liquid-vapor separation zone, obtaining a liquid containing solvent and dissolved soluble polymer and a vapor which are removed separately from said zone,
  (b) passing said liquid into a drying zone,
  (c) removing in said drying zone from said liquid some vapor not removed in said liquid-vapor zone,
  (d) removing from said drying zone a liquid containing solvent and dissolved soluble polymer,
  (e) passing said liquid containing solvent and dissolved soluble polymer into a heated polymer removal zone,
  (f) in said heated polymer removal zone separating and obtaining solvent vapor from said liquid containing solvent and said dissolved soluble polymer, forming a kettle product essentially containing said dissolved soluble polymer now removed from the solvent,
  (g) removing said polymer from said heated polymer removal zone,
  (h) passing a portion of said solvent vapor into heat exchange with liquid in said drying zone, and
  (i) passing another portion of said solvent vapor into said liquid-vapor zone to assist in the liquid-vapor separation action in said liquid-vapor separation zone.

6. A recovery as in claim 5 wherein the solution of said monomer and polymer in said solvent is obtained from a polymerization of a 1-olefin having 1–8 carbon atoms.

7. In the production of a polyolefin by a solution polymerization in which an olefin is polymerized in a solvent and in which there is practiced a recovery which comprises passing said solution of the olefin and polymer formed in said solvent into a flashing zone, therein subjecting said solution to flashing conditions and to the stripping action of hot solvent vapor obtained as hereinafter described, recovering the vapor stream-containing solvent and substantially unpolymerized monomer, removing and condensing said vapor stream, passing a liquid stream, thus obtained, to a drying zone, in said drying zone, heating said liquid stream using heat obtained as hereinafter described, obtaining in, and removing from, said drying zone, water and light hydrocarbon vapors not removed from said solution in said flashing zone, removing from said drying zone liquid containing solvent and soluble polymer therein, passing said liquid into a heated distillation zone, in said heated distillation zone, distilling, separating and recovering solvent vapor from said soluble polymer, passing a portion of solvent vapor into heat exchange with the said liquid in said drying zone, and passing another portion of said solvent vapor into said flashing zone as said hot solvent vapor to provide therein said stripping action.

8. In the production of a polyolefin by a solution polymerization in which an olefin is polymerized in a solvent and in which there is practiced a recovery which comprises passing said solution of the olefin and polymer formed in said solvent into a flashing zone, therein subjecting said solution to flashing conditions and to the stripping action of hot solvent vapor obtained as hereinafter described, recovering the vapor stream-containing solvent and substantially unpolymerized monomer, removing and condensing said vapor stream, passing a liquid stream, thus obtained, to a drying zone, in said drying zone, heating said liquid stream using heat obtained as hereinafter described, obtaining in, and removing from said drying zone, water and light hydrocarbon vapors not removed from said solution in said flashing zone, removing from said drying zone liquid containing solvent and soluble polymer therein, passing said liquid into a heated distillation zone, in said heated distillation zone, distilling, separating and recovering solvent vapor from said soluble polymer, passing a portion of solvent vapor into heat exchange with the said liquid in said drying zone, thus heating the liquid in said drying zone and condensing at least a portion of said solvent vapor, returning at least a part of the now condensed solvent vapor to said distillation zone as a reflux therefor, and passing another portion of said solvent vapor into said flashing zone as said hot solvent vapor to provide therein said stripping action.

9. In the recovery of a monomer, polymer and solvent from a solution of the monomer and polymer in said solvent which comprises:
  (a) passing said solution to a liquid-vapor separation zone, obtaining a liquid containing solvent and dissolved soluble polymer, and a vapor which are removed separately from said zone,
  (b) passing said liquid into a drying zone,
  (c) removing from said drying zone some vapors not removed in said liquid-vapor separation zone,
  (d) removing from said drying zone a liquid containing solvent and dissolved soluble polymer,
  (e) passing said liquid containing solvent and dissolved soluble polymer into a heated polymer removal zone,
  (f) in said heated polymer removal zone separating and obtaining solvent vapor from said liquid containing solvent and dissolved soluble polymer, forming a kettle product essentially containing said dissolved soluble polymer now removed from the solvent,
  (g) removing said polymer from said heated polymer removal zone,
  (h) passing a portion of said solvent vapor into heat exchange with liquid in said drying zone, thus heating the liquid in said drying zone and condensing at least a portion of said solvent vapor, returning at least a part of the now condensed solvent to said heated polymer removal zone as a reflux therefor, and
  (i) passing another portion of said solvent vapor into said liquid-vapor separation zone to assist in the liquid-vapor separation action in said liquid-vapor separation zone.

References Cited by the Examiner

UNITED STATES PATENTS

| | | | |
|---|---|---|---|
| 2,510,548 | 6/1950 | Brunjes | 202—174 |
| 2,858,902 | 11/1958 | Cottle | 183—114.2 |
| 3,042,637 | 7/1962 | Crouch | 260—94.9 X |
| 3,073,812 | 1/1963 | Henderson | 260—94.9 |

OTHER REFERENCES

McCabe and Smith: "Unit Operations of Chemical Engineering," (p. 565) (1956).

JOSEPH L. SCHOFER, *Primary Examiner.*